(12) United States Patent
Mahr et al.

(10) Patent No.: US 6,208,096 B1
(45) Date of Patent: Mar. 27, 2001

(54) OPTIMIZED WINDING DRIVE

(75) Inventors: Peter Mahr, Weiler; Klaus Oldermann, Villingen-Schwenningen, both of (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/236,959

(22) Filed: Jan. 25, 1999

(30) Foreign Application Priority Data

Feb. 20, 1998 (DE) ............................................... 198 07 088

(51) Int. Cl.$^7$ .................................................... B65H 59/38
(52) U.S. Cl. ..................... 318/6; 318/7; 318/34; 318/63; 318/68; 318/8; 318/80
(58) Field of Search ............................ 318/6, 7, 34, 63, 318/68, 8, 86

(56) References Cited

U.S. PATENT DOCUMENTS

| | | |
|---|---|---|
| 3,731,176 | 5/1973 | Mitchell et al. . |
| 3,737,751 | 6/1973 | Lima . |
| 3,801,192 * | 4/1974 | Vaast ........................................ 318/6 |
| 3,906,299 | 9/1975 | Mittelstaedt . |
| 4,097,785 | 6/1978 | Sato et al. . |
| 4,267,564 | 5/1981 | Flores . |
| 4,381,089 | 4/1983 | Kondo . |
| 4,448,368 * | 5/1984 | Skalko ..................................... 318/6 |
| 5,209,422 | 5/1993 | Lee . |

FOREIGN PATENT DOCUMENTS

| | | |
|---|---|---|
| 392552 | 9/1990 | (AT) . |
| 2228735 | 1/1973 | (DE) . |
| 3225295 | 1/1984 | (DE) . |
| 3637786 | 5/1988 | (DE) . |
| 4139587 | 6/1993 | (DE) . |
| 4243329 | 6/1994 | (DE) . |
| 0322177 | 6/1989 | (EP) . |
| 0392023 | 10/1990 | (EP) . |
| 0583724 | 2/1994 | (EP) . |
| 2108718 | 5/1983 | (GB) . |

OTHER PUBLICATIONS

Search Report for German Patent Appln. No. 198 07 088.8.
Search Report for EPO Application No. 99101681.7–2210.

* cited by examiner

*Primary Examiner*—Karen Masih
(74) *Attorney, Agent, or Firm*—Joseph S. Tripoli; Joseph J. Laks; Daniel E. Sragow

(57) ABSTRACT

In a tape transport for recording and/or reproducing signals by means of a recording medium using separate winding motors for driving the winding plates, the drive of the winding motors servo units is constructed as open-loop control devices and/or closed-loop control devices. Such servo units can advantageously be used for open-loop control and/or closed-loop control of the drive of the winding motor even during a braking operation.

9 Claims, 2 Drawing Sheets

OPTIMIZED WINDING DRIVE

BACKGROUND OF THE INVENTION

The invention relates to a winding drive for a material in tape form. The invention proceeds from the winding device of a recorder for recording and/or reproducing signals by means of a recording medium in tape form and separate winding motors for driving the winding plates.

Such a winding drive is known, for example, from U.S. Pat. No. 3,906,299. For the purpose of braking the winding plates, particularly when switching over from winding mode into the stop mode, it is provided there during a rewinding operation to switch off the respectively pulling winding motor, also termed the motor on the winding-up side, and in this case to supply the respective other motor, also termed the motor on the unwinding side, with field current in such a way that the transport of the recording medium is braked and finally comes to a standstill, an evaluation circuit ensuring that the field current is switched off in good time so that no reverse movement can occur. The EMF generated in the respectively idling motor on the winding-up side serves as criterion in this case.

During a braking operation, such braking devices exert a uniform pulling action on the recording medium. Because of different mass distribution in the recording medium on the winding plates, however, it is possible for an indeterminate braking characteristic and thus for different braking distances and braking times to occur.

SUMMARY OF THE INVENTION

It is therefore the object of the invention to specify a method for driving such a winding device with an improved braking behaviour.

The invention relates to a method for controlling the drive of an appliance for transporting a recording medium in tape form, having two separate winding motors, in which the winding device is braked by means of stepwise controlling the two winding motors. The method comprises the steps of measuring respective instantaneous rotary movement of the two winding motors, comparing each respective measured instantaneous rotary movement with a desired value, deriving signals from both winding motors representative of differences between measured instantaneous values and the respective desired values, controlling the energization of each winding motor as a function of a sequence of paired reference values corresponding to respective rotational speed values, and progressing to a subsequent pair of reference values as soon as the rotational speed and assigned reference value of the respective winding motor correspond to one another.

A further object of the invention consists in specifying a winding device of the aforementioned type having an improved braking behaviour.

The invention is based on the idea configuring a winding device with separate winding motors to be capable of open-loop control and/or closed-loop control in such a way that—particularly at the end of a search or rewind operation—braking operations can take place in any defined fashion with respect to the braking time or a target position.

It is preferred to use servo units constructed as open-loop and/or closed-loop devices for driving the winding motors, with the result that it is possible in principle to dispense with driving the recording medium by means of a capstan and capstan idler, something which is otherwise customary when operating a recorder to record and/or reproduce. In accordance with the invention, these servo units are configured in such a way that they can advantageously be used for open-loop control and/or closed-loop control of the drive of the winding motor even during a braking operation. Developments and further advantages emerge from the following description.

BRIEF DESCRIPTION OF THE DRAWINGS

The invention is explained in more detail with the aid of an exemplary embodiment. In the drawings.

DETAILED DESCRIPTION

Figure 1:
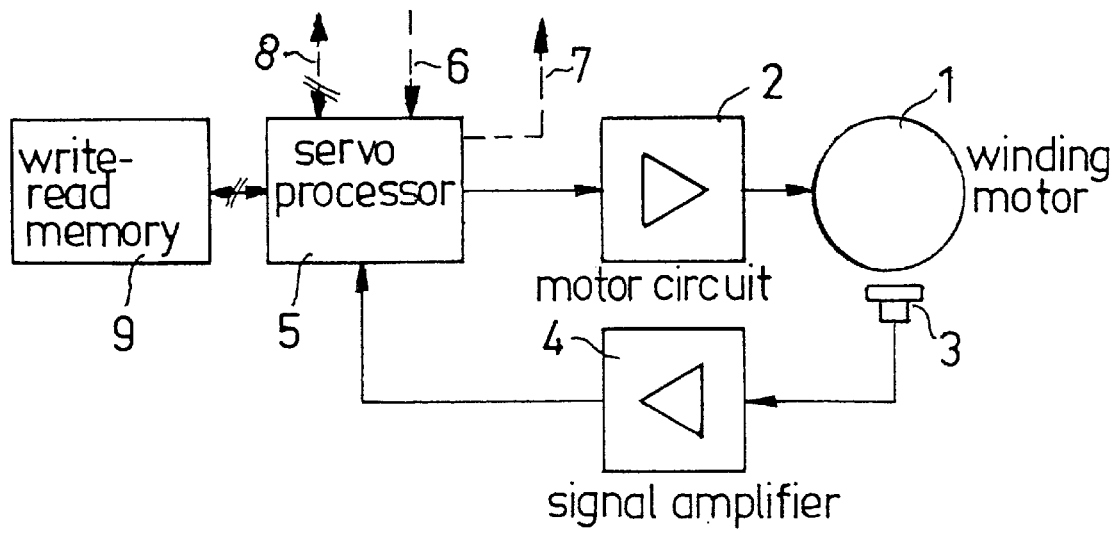
FIG. 1 shows a block diagram of a servocircuit for a winding drive.

With the aid of a block diagram, FIG. 1 shows the principle of a servo circuit for the open-loop control and/or closed-loop control of a winding motor 1 of the winding device of an appliance for recording and/or reproducing information, termed a recorder below, with a recording medium (not represented) which is in tape form and is mounted distributed between two bobbins (likewise not represented)—for example of a tape cassette.

Since it is the case that in a recorder two sides of the winding device virtually correspond to one another with regard to structural design and electric drive, for the sake of simplicity only one of the two servocircuits is represented.

Each of the servo circuits has a so-called motor circuit 2 for the open-loop control of the winding motor 1 and supplying it with field current. It is presently electronically commutatable DC motors which are used as winding motors 1. In order to detect the rotary movement of the respective winding motor 1, each servocircuit further has a sensor device with at least one sensor 3 whose output is connected via a signal amplifier 4 to a so-called servo processor 5 which is constructed as a microprocessor and can also be part of an integrated circuit for the operator control system and/or sequence control system in the recorder. The dashed lines 6, 7 are intended to symbolize its corresponding connection to the servo circuit of the other winding motor 1. Moreover, a further dashed line 8 symbolizes this connection for communication with the devices (not represented) from the operation and sequence control of the recorder.

The servo processor 5 contains means for evaluating signals in order to carry out computing operations and to generate control signals for the open-loop control and/or closed-loop control of the winding motors 1 with reference to the customary operating modes such as, for example, "record", "play", "search" and "rewind" as well as, in accordance with the present invention, a stepwise open-loop control and/or closed-loop control of two winding motors 1 during a braking operation. The mode of operation of two servo circuits during a braking operation is explained below.

The stepwise open-loop control and/or closed-loop control of the respective winding motor 1 during a braking operation is based on a sequence of reference values to which, for example, rotational speed values correspond. The respective sequence of reference values which simultaneously forms a sequence of reference value pairs is stored in a write-read memory 9, which is represented separately but can also be a part of the servo processor 5. The open-loop control and/or closed-loop control of the winding motors 1 is performed in this case in principle in such a way that a progression is made in each case to the next reference value pair as soon as the rotational speed and assigned reference value of the respective winding motor 1 correspond to one another.

Progressing to the respective next reference value pair can, however, be made to depend on the attainment of the respective desired rotational speed of that winding motor 1 which in the case of a preceding winding or rewinding operation is respectively the pulling one or the one on the winding-up side, for the case in which said motor should first reach its desired rotational speed within the respective open-loop and/or closed-loop step. In such a case, after attaining its desired rotational speed, this winding motor 1 is operated virtually unbraked (that is to say idling) until the other winding motor 1, respectively on the unwinding side, has reached a desired rotational speed which corresponds to the reference value of the subsequent step. Not until then is a progression made again in a pairwise fashion to the following reference value pairs. Looping of the recording medium is avoided thereby. Instead of idling operation, it is also possible to reduce the braking action until the other winding measure 1, respectively on the unwinding side, has attained a desired rotational speed which corresponds to the reference value of more than one of the subsequent steps.

The progression to the reference value pair respectively following is preferably, however, determined solely by the winding motor 1 which is respectively one on the unwinding side during the preceding winding operation or rewinding operation, this being performed by braking said motor somewhat more strongly in each case by comparison with the other winding measure 1. This can be realized in a relatively simple way by a correspondingly small offset of the respective control signals by one of the two winding motors 1. This solution has the further advantage that it is possible with such an offset for the behaviour of the braking action of the two winding motors 1 to be varied relative to one another in a simple way, and thus alter the tensile force with which the recording medium is held under tension during transport between two winding members.

The number of the open-loop and/or closed-loop steps, and thus the number of the reference values per braking operation is preferably prescribed by the servo processor 5 as a function of the operating mode of the recorder and/or the transport speed of the recording medium, it being possible for the servo processor 5 to take account of the resolution of the sensor device, that is to say the number of measurements per winding motor revolution, as well as the transport speed of the recording medium and the speed ratio of the winding motors 1, which results from the mass distribution of the recording medium.

It is possible in this case to make advantageous use of appropriate devices for determining displays of a status and/or remaining play time, which are present in any case in many present day recorders, as well as of the data continuously determined for this purpose.

The reference values are determined in each case as a function of the number of the open-loop and/or closed-loop steps. In this case, their respective reference values ($Ref_1$ or $Ref_2$) of the respective winding motor 1 are based on the following equations:

$$Ref_1 = n_1 - n_1/M * m \text{ and } Ref_2 = n_2 - n_2/M * m$$

where $n_1$ and $n_2$ are the respective winding motor speeds at the start of a braking operation, M stands for the total number of the open-loop and/or closed-loop steps per braking operation, and m denotes the respective open-loop and/or closed-loop step.

Figure 3:
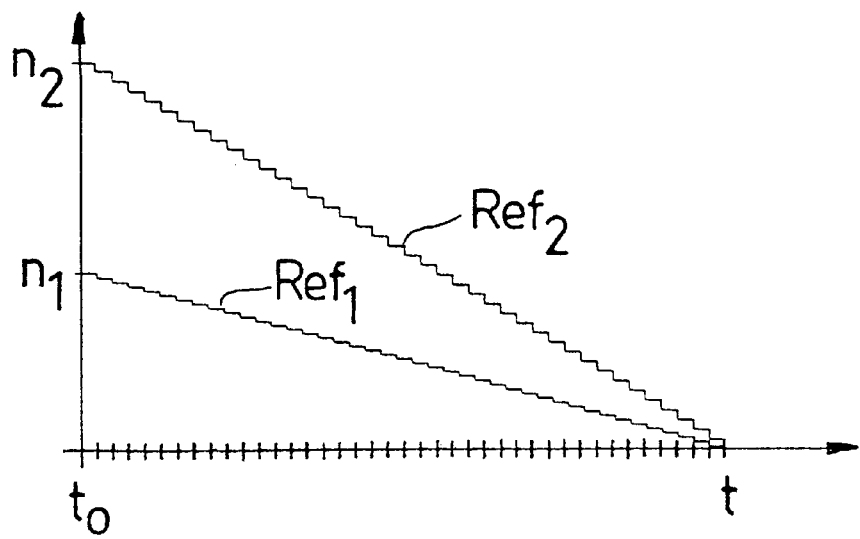
FIG. 3 shows a diagram with step-shaped characteristics for a symbolic representation of the rotary movement characteristics in accordance with FIG. 2, in conjunction with reference values for open-loop and/or closed-loop steps.

A characteristic, calculated on the basis of the equations, of the respective sequence of reference values is represented symbolically in FIG. 3 with the characteristic, step-shape in each case, of the two lines $Ref_1$ and $Ref_2$. The reference values are calculated in each case at the start of a braking operation, with the input of a command signal for a change to be instituted in the mode of operation of the servo processor 5, and are starred in the write-read memory 9.

Figure 2:
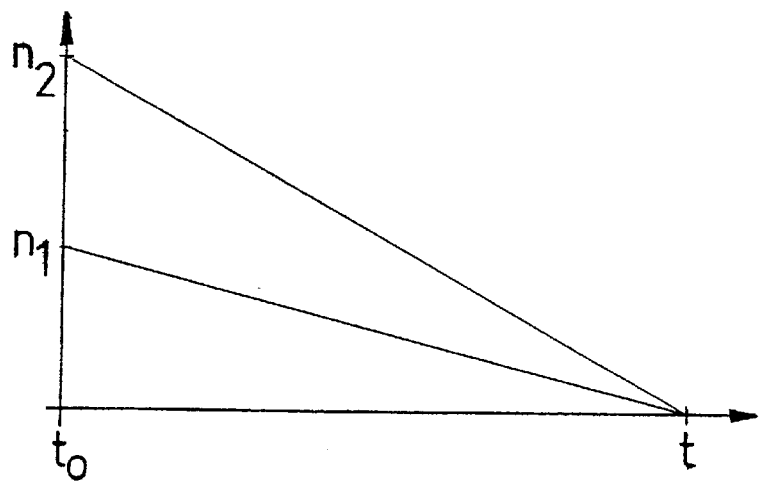
FIG. 2 shows a diagram representing the rotary movement characteristics of the winding motor during a braking operation of the winding drive.

FIG. 2 shows a schematic diagram with a representation of the rotary movement of the winding motor 1 as a function of time during a braking operation of the winding drive. A representation is given of the respective rotational speed characteristic of the winding motors 1 during a braking operation, for example on the basis of switching over from the "rewind" to the "stop" operating mode. It is assumed in this case that the mass distribution the two bobbins differs, with the result that transport of the recording is necessarily associated with different rotational speeds $n_1$, $n_2$ between two winding motors 1. The respective rotational speed $n_1$ or $n_2$ is specified on the ordinate of the diagram, the abscissa thereof being, for example, a measure of the braking time t, which is to start in each case at the instant $t_0$ with the end of transport by the recording medium, and to end at the instant $t_M$ with the M-th open-loop and/or closed-loop step.

The respective rotational speed characteristic represented in FIG. 2 as a function of the braking time t and as a linear relationship is based on a constant braking action. It is the result of the inventive open-loop control and/or closed-loop control of the respective winding motor 1 during a braking operation by in each case a braking force which is constant on average and is based on the control signal of the respective winding motor 1. In this case, a rotating magnetic field is generated in a fashion opposed to the instantaneous direction of rotation of the motor by means of the respective control signal, termed the motor control signal below. In the case of electronically commutated winding motors, the direction of commutation of the respective winding motor 1 is reverse for this purpose, in the case that—depending on the motor control unit used—the respective braking force is determined by the amplitude or the pulse width ratio of the motor control signal. The linear relationship between the braking force and field current can be used in a simple way for open-loop control and/or closed-loop control of the braking time, and thus of the rotational speed characteristic with the aid of a microprocessor constructed as a servo processor 5.

The determination of the respective braking force is based on a further evaluation of the rotary movement of the respective winding motor 1, as measured at the instant $t_0$ and at the end of the respective open-loop and/or closed-loop step, by virtue of the fact that these measurements are used at the same time to determine the duration of the respective open-loop and/or closed-loop step and evaluates the two with the aid of the servo processor 5, whereupon the latter uses the respective result in a way known per se to generate motor control signals which subject the winding motors 1 to open-loop control and/or closed-loop control via the motor circuits 2. The respective evaluation is based in this case on a time comparison of the duration of the respective open-loop and/or closed-loop step, with the use in each case of a time base which is derived, for example, from the total braking time ($t_M$-$t_0$).

Thus, the inventive stepwise open-loop control and/or closed-loop control of the drive of the winding device is based on two different measurement and comparison operations, specifically, on the one hand, on the continuous measurement of the rotary movement of the respective winding motor 1 and its comparison with a reference value for a progression to a subsequent reference value and, on the other hand, on the measurement, which depends on the respective progression, of the duration of the respective open-loop and/or closed-loop, and its comparison with a time base at the end of the respective open-loop and/or closed-loop step.

Figure 4:
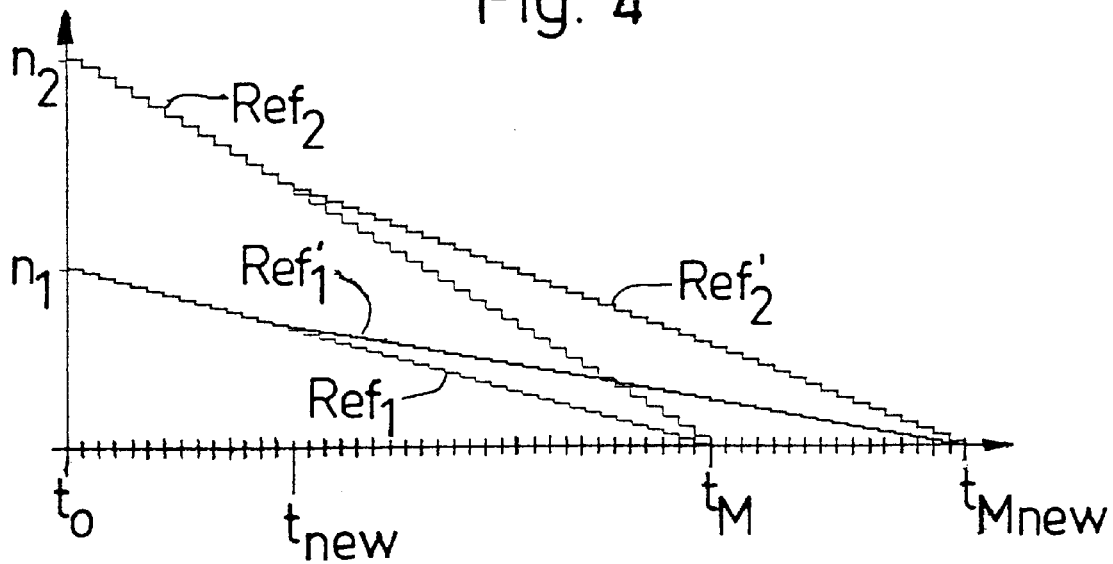
FIG. 4 shows a diagram with step-shaped characteristics for a symbolic representation of further rotary movement characteristics of the winding motors during a braking operation, in conjunction with reference values for open-loop and/or closed-loop steps.

The braking time is determined by the servo processor 5 essentially as a function of the operating mode of the recorder and/or the transport speed of the recording medium. For the case in which—as represented symbolically in FIG. 4 by the step-like characteristics $Ref_1$ and $Ref_2$ as well as $Ref_1'$ and $Ref_2'$—during a braking operation changes in rotational speed should occur which are so large that the open-loop and/or closed-loop control range of the servo unit would have to be overshot by at least one of the winding motors 1, it is provided to increase the total braking period ($t_M$-$t_0$) by preferably approximately 30%, it being the case that either the aforementioned time base or the number of the open-loop and/or closed-loop steps, and thus also the number of reference values are changed accordingly. Use is preferably made as criterion of a sequence of, for example, 5 open-loop and/or closed-loop steps, in the case of which sequence the duration of the last open-loop and/or closed-loop step does not, despite the maximum motor control signal, yet correspond to the desired value, and/or the difference between the actual value and desired value is still too large by the corresponding amount. In accordance with FIG. 4, the total making time ($t_{Mnew}$-$T_0$) is determined a new at the instant $t_{new}$.

However, should this measure not yet have been sufficient, one or more further enlargements of the total braking period can be carried out, as a result of which it is possible for the braking behaviour and open-loop servo control and/or closed-loop servo control of the winding drop of the winding device to be optimally tuned to one another. On the other hand, this also yields the possibility of fully utilizing all the capacity of the servo unit to shorten the braking period. For this purpose, the minimum number of reference values is determined, using the full open-loop control and/or closed-loop control range of the servo device of the respective winding motor 1 once, and preferably at prescribed intervals, as a function of the respective speed ratio of the winding motors 1, and is stored in the servo processor 5 as a basis for later braking operations.

At the end of a braking operation, something which can be established with the sensor device, or else by evaluating the counter-E.M.F. generated in one of the motor windings, it is possible for the winding motors 1 to be kept in the rotary position last assumed by means of a relatively small static magnetic exciter field, thus rendering it possible to dispense with the mechanical braking devices otherwise customary with the recorder.

What is claimed is:

1. Method for controlling the drive of a winding device, in particular the winding device of an appliance for transporting a recording medium in tape form, having two separate winding motors, in which the winding device is braked by means of stepwise controlling the two winding motors, said method comprising the steps of:

a) measuring respective instantaneous rotary movement of the two winding motors, b) comparing each respective measured instantaneous rotary movement with a desired value, c) deriving signals from both winding motors representative of differences between measured instantaneous values and the respective desired values, d) controlling the energization of each winding motor as a function of a sequence of paired reference values corresponding to respective rotational speed values, and e) progressing to a subsequent pair of reference values as soon as the rotational speed and assigned reference value of the respective winding motor correspond to one another.

2. Method as claimed in claim 1 wherein a determination of the reference values is based on the following equations:

$$Ref_1 = n_1 - n_1/M * m \text{ and } Ref_2 = n_2 - n_2/M * m$$

where $n_1$ and $n_2$ are the respective winding motor speeds at the start of a braking operation, M stands for the total number of control steps per braking operation, and m denotes the respective control step.

3. Method as claimed in claim 1 wherein said stepwise controlling the drive of the winding device is based on two different measurement and comparison operations: on the one hand, on the continuous measurement of the rotary movement of the respective winding motor and the comparison of them with a reference value for progressing to a subsequent reference value and, on the other hand, on the measurement, dependent on the respective progression, duration of the respective control step and the comparison of them with a time base at the end of the respective control step.

4. Method as claimed in claim 1 wherein a total braking period is essentially a function of one of the operating mode of the appliance and of the transport speed of the recording medium.

5. Method as claimed in claim 1 wherein a) said stepwise controlling the drive of the winding device is based on two different measurement and comparison operations: on the one hand, on the continuous measurement of the rotary movement of the respective winding motor and the comparison of them with a reference value for progressing to a subsequent reference value and, on the other hand, on the measurement, dependent on the respective progression, duration of the respective control step and the comparison of them with a time base at the end of the respective control step; and b) the time base is derived from the total braking period.

6. Method as claimed in claim 1 wherein a) said stepwise controlling the drive of the winding device is based on two different measurement and comparison operations: on the one hand, on the continuous measurement of the rotary movement of the respective winding motor and the comparison of them with a reference value for progressing to a subsequent reference value and, on the other hand, on the measurement, dependent on the respective progression, duration of the respective control step and the comparison of them with a time base at the end of the respective control step;

b) the time base is derived from the total braking period; and
c) the total braking period is essentially a function of one of the operating mode of the appliance and of the transport speed of the recording medium.

7. Method as claimed in claim 1 wherein
a) said stepwise controlling the drive of the winding device is based on two different measurement and comparison operations: on the one hand, on the continuous measurement of the rotary movement of the respective winding motor and the comparison of them with a reference value for progressing to a subsequent reference value and, on the other hand, on the measurement, dependent on the respective progression, duration of the respective control step and the comparison of them with a time base at the end of the respective control step;
b) the time base is derived from the total braking period;
c) the total braking period is essentially a function of one of the operating mode of the appliance and of the transport speed of the recording medium; and
d) the determination of the reference values is based on the following equations:

$$\text{Ref}_1 = n_1 - n_1/M * m \text{ and } \text{Ref}_2 = n_2 - n_2/M * m$$

where $n_1$ and $n_2$ are the respective winding motor speeds at the start of a braking operation, M stands for the total number of the control steps per braking operation, and m denotes the respective control step.

8. Method as claimed in claim 1 wherein
a) said stepwise controlling the drive of the winding device is based on two different measurement and comparison operations: on the one hand, on the continuous measurement of the rotary movement of the respective winding motor and the comparison of them with a reference value for progressing to a subsequent reference value and, on the other hand, on the measurement, dependent on the respective progression, duration of the respective control step and the comparison of them with a time base at the end of the respective control step;
b) the time base is derived from the total braking period;
c) the total braking period is essentially a function of one of the operating mode of the appliance and of the transport speed of the recording medium;
d) the determination of the reference values is based on the following equations:

$$\text{Ref}_1 = n_1 - n_1/M * m \text{ and } \text{Ref}_2 = n_2 - n_2/M * m$$

where $n_1$ and $n_2$ are the respective winding motor speeds at the start of a braking operation, M stands for the total number of the control steps per braking operation, and m denotes the respective control step; and
e) the number of the control steps can be prescribed.

9. Method as claimed in claim 1 wherein the total braking period is essentially a function of one of the operating mode of the appliance and of the transport speed of the recording medium, and the total braking period and servo devices of the winding motors can be tuned to one another.

* * * * *